United States Patent
Russell

(10) Patent No.: US 7,711,794 B2
(45) Date of Patent: May 4, 2010

(54) ADJUSTING TIMING BETWEEN AUTOMATIC, NON-USER-INITIATED POLLINGS OF SERVER TO DOWNLOAD DATA THEREFROM

(75) Inventor: Paul F. Russell, Queanbeyan (AU)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 11/047,841

(22) Filed: Feb. 1, 2005

(65) Prior Publication Data

US 2006/0173971 A1 Aug. 3, 2006

(51) Int. Cl.
*G06F 15/16* (2006.01)

(52) U.S. Cl. .................. 709/217; 709/223; 709/224; 709/230

(58) Field of Classification Search .......... 709/217, 709/223, 230, 224
See application file for complete search history.

(56) References Cited

U.S. PATENT DOCUMENTS

| | | | |
|---|---|---|---|
| 5,889,963 A | 3/1999 | Gopal et al. | |
| 5,907,681 A * | 5/1999 | Bates et al. | 709/228 |
| 6,006,017 A | 12/1999 | Joshi et al. | |
| 6,061,723 A | 5/2000 | Walker et al. | |
| 6,112,239 A * | 8/2000 | Kenner et al. | 709/224 |
| 6,320,585 B1 * | 11/2001 | Engel et al. | 345/440 |
| 6,449,663 B1 | 9/2002 | Carney et al. | |
| 6,557,026 B1 * | 4/2003 | Stephens, Jr. | 709/203 |
| 6,640,268 B1 | 10/2003 | Kumar | |
| 6,681,249 B2 | 1/2004 | Christensen et al. | |
| 6,938,099 B2 * | 8/2005 | Morton et al. | 709/246 |
| 6,950,991 B2 * | 9/2005 | Bloomfield et al. | 715/738 |
| 7,184,753 B2 * | 2/2007 | Huynh | 455/412.1 |
| 7,269,433 B2 * | 9/2007 | Vargas et al. | 455/502 |
| 7,289,495 B2 * | 10/2007 | Roy | 370/381 |
| 7,389,349 B2 * | 6/2008 | Kouznetsov et al. | 709/224 |
| 2002/0112040 A1 | 8/2002 | Chang et al. | |
| 2002/0156897 A1 * | 10/2002 | Chintalapati et al. | 709/227 |
| 2003/0097417 A1 | 5/2003 | Lin et al. | |
| 2003/0204561 A1 * | 10/2003 | Briscoe et al. | 709/203 |
| 2004/0039630 A1 * | 2/2004 | Begole et al. | 705/11 |
| 2004/0153537 A1 * | 8/2004 | Rezvani et al. | 709/223 |
| 2004/0236880 A1 * | 11/2004 | Barrett | 710/52 |
| 2005/0033863 A1 * | 2/2005 | Tosey | 709/248 |
| 2005/0210128 A1 * | 9/2005 | Cannon et al. | 709/224 |
| 2006/0075048 A1 * | 4/2006 | Gruper et al. | 709/206 |
| 2006/0161394 A1 * | 7/2006 | Dulberg et al. | 702/184 |

* cited by examiner

*Primary Examiner*—John Follansbee
*Assistant Examiner*—Anthony Mejia
(74) *Attorney, Agent, or Firm*—Steven Lieske Bennett

(57) ABSTRACT

The timing between automatic, non-user-initiated pollings of a server to download data from the server is changed. In one embodiment, user input in relation to polling the server to download data from the server is detected. In response, the timing between automatic, non-user-initiated pollings of the server is changed based at least on the user input detected. In another embodiment, the amount of data downloaded from the server at each polling is tracked. The timing between pollings of the server is thus changed based on the amount of data downloaded from the server during the pollings of the server. The server may be an email server, such that the data downloaded therefrom includes email messages.

19 Claims, 6 Drawing Sheets

ADJUSTING TIMING BETWEEN AUTOMATIC, NON-USER-INITIATED POLLINGS OF SERVER TO DOWNLOAD DATA THEREFROM

FIELD OF THE INVENTION

The present invention relates generally to periodically polling a server to download data from the server, and more specifically to adjusting the timing between such pollings of the server.

BACKGROUND OF THE INVENTION

In many networked computing environments, client computing devices routinely poll server computing devices to download data from the server devices. For example, electronic mail ("email") for a number of clients is typically stored on an email server. A given client periodically polls the email server to determine if there are any new email messages to download. If there are, then the client downloads the email messages from the email server.

Polling of the email server can be initiated by the client in at least two ways. First, an application program on the client will usually have a way for the user to manually initiate polling of the email server. For example, there may be a "send/receive email" command or button that when selected by the user, causes the client to poll the email server to determine whether there are any new email messages to be downloaded, and if so, to download the new messages.

Second, the client typically will automatically periodically poll the email server without user initiation, especially where an email application program is actively running on the client. The user may be able to specify how frequently to poll the email server, but otherwise does not control the polling process. For example, the user may indicate that the email server should be polled every ten minutes. Therefore, every ten minutes the client polls the email server automatically, without user intervention, to download any new email messages from the email server.

The number of email messages to be downloaded from the email server can vary over time. For instance, one week the user may not receive many email messages at all, such that polling the server every ten minutes is too frequent. Another week the user may receive many email messages, such that polling the server every ten minutes is not frequent enough to timely download received email messages. Thus, the static timing between automatic, non-user-initiated pollings of the email server is less than ideal in typical usage scenarios.

Furthermore, at other times, the user may be expecting an important email message. In such cases, the automatic polling of the email server every ten minutes may be too infrequent, such that the user instead manually initiates polling frequently to learn whether the expected email message has arrived yet. The user having to manually initiate polling frequently, however, can be inconvenient. For these and other reasons, therefore, there is a need for the present invention.

SUMMARY OF THE INVENTION

The present invention relates to changing the timing between automatic, non-user-initiated pollings of a server to download data from the server. A method of the invention detects user input in relation to polling the server to download data from the server. In response, the timing between automatic, non-user-initiated pollings of the server is changed based at least on the user input detected. The method may further include tracking the amount of data downloaded from the server at each polling. In such an embodiment, the timing between pollings of the server is further changed based on the amount of data downloaded from the server during the pollings of the server.

Another method of the invention tracks email messages downloaded from an email server at each automatic, non-user-initiated polling of the email server. The timing between future automatic, non-user-initiated pollings of the email server is changed based at least on email messages downloaded during the most recent polling of the email server, compared to email messages downloaded during previous pollings of the email server. The method may further include detecting user input in relation to polling of the email server, such that the timing between pollings of the server is further changed based on the user input detected.

A computing device of the invention includes a communication mechanism, an application program, and a mechanism. The communication mechanism is to communicatively couple the computing device to a network to which a server is also communicatively coupled. The application program is to periodically and automatically poll the server without user initiation to download data from the server. The mechanism is to change the timing between automatic, non-user-initiated pollings of the server, based at least on user input in relation to polling the server.

An article of manufacture of the invention includes a computer-readable medium and means in the medium. The computer-readable medium may be a recordable data storage medium, a modulated carrier signal, or another type of computer-readable medium. The means is for changing the timing between automatic, non-user-initiated pollings of a server to download data from the server. The timing is changed based at least on the amount of data downloaded from the server at each polling.

Embodiments of the invention provide for advantages over the prior art. For example, when an embodiment of the invention detects that the user is performing specific user input in relation to polling a server to download data from the server, the timing between automatic, non-user-initiated pollings of the server may be reduced. Such user input may include the user initiating manual polling of the server, as well as bringing the window of the application program that downloads data from the server to the foreground relative to the windows of other programs.

As another example, when the amount of data downloaded during the most recent polling of the server exceeds the average amount of data downloaded from the server during previous pollings, the timing between automatic, non-user-initiated future pollings of the server may be reduced. Similarly, when the amount of data downloaded during the most recent polling is less than the average amount of data downloaded from the server during previous pollings, the timing between future such pollings of the server may be lengthened. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
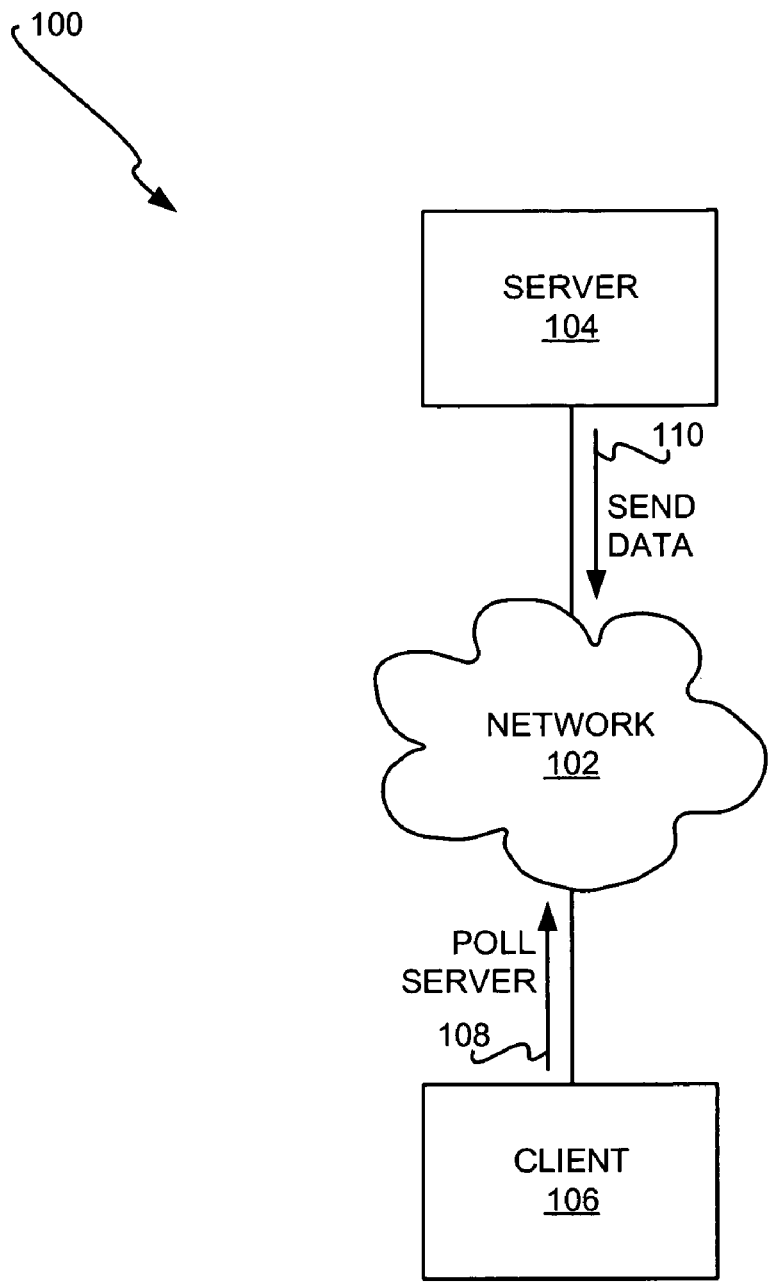
FIG. 1 is a diagram of a representative system, according to an embodiment of the invention.

FIG. 1 shows a representative system 100, according to an embodiment of the invention. The system 100 includes a network 102, to which a server 104 and a client 106 are communicatively connected. The network 102 may be or include local-area networks (LAN's), wide-area networks (WAN's), intranets, extranets, the Internet, wired networks, wireless networks, telephony networks, as well as other types of networks. Each of the server 104 and the client 106 is a computing device. For instance, such computing devices include desktop computing devices, rack-mounted computing devices, blade computing devices, as well as portable computing devices such as laptop and notebook computing devices, personal digital assistant (PDA) devices, and mobile phones, among other types of computing devices.

Periodically and automatically, the client 106 polls the server 104 without user initiation, to determine whether the server 104 has any data that the client 106 should download from the server 104, as indicated by the arrow 108. Polling by the client 106 of the server 104 can encompass the client 106 communicating with the server 104 over the network 102, such as by sending a request for any new data that the server 104 may be storing and that can be downloaded to the client 106. In response, the server 104 sends any such data to the client 106, as indicated by the arrow 110, over the network 102. The transmission of the data from the server 104 to the client 106 is referred to as downloading of the data by the client 106 from the server 104.

The polling of the server 104 by the client 106 is automatic and without user initiation in that a user does not initiate the polling. For instance, the user may have initially affirmed or set the period at which the client 106 is to automatically poll the server 104. However, with respect to a specific such polling of the server 104, the user does not particularly initiate the polling. Rather, the client 106 automatically polls the server 104 periodically without user initiation.

According to the present invention, the timing between the pollings of the server 104 is variable, or dynamically changeable. As is described in more detail later in the detailed description, depending on user input at the client 106 as to polling of the server 104, and/or on the data downloaded as a result of the pollings of the server 104, the timing between the pollings of the server 104 may be changed. The timing between the pollings of the server 104 refers to how long the client 106 waits after polling the server 104 before polling the server 104 again.

Embodiments of the invention are not limited to the type of server 104 and the type of data downloaded by the client 106 from the server 104. However, in one embodiment, the server 104 is an email server. In such an embodiment, the client 106 polls, or contacts, the server 104 periodically to determine whether the email server has received any new email messages. If so, then the client 106 downloads these new email messages from the server 104.

Figure 2:
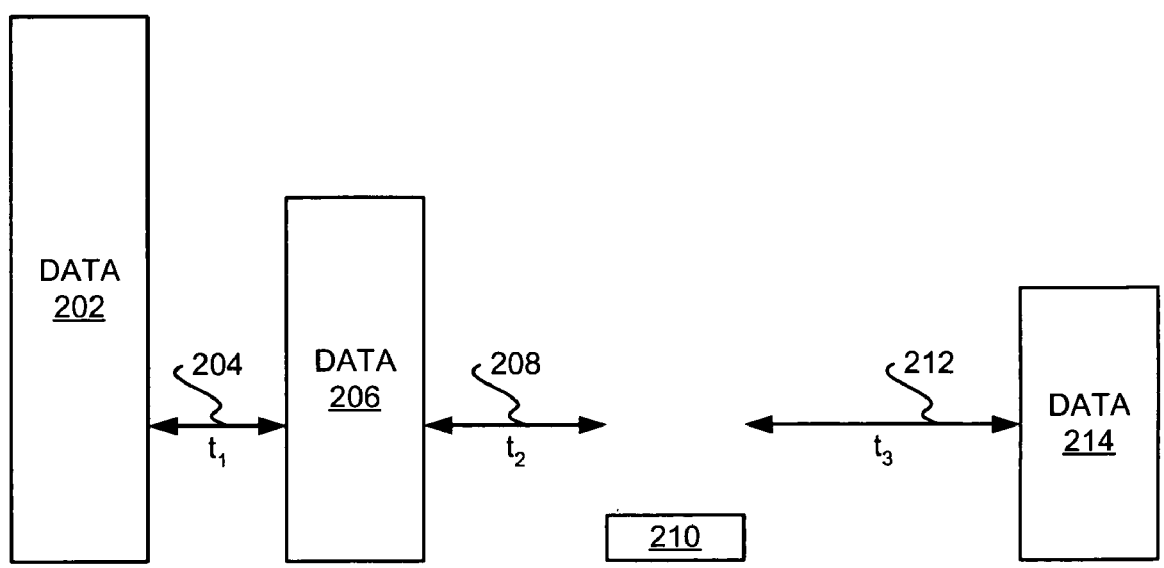
FIG. 2 is a diagram depicting how the timing between automatic, non-user-initiated pollings of a server is changed based on the data downloaded from the server, according to an embodiment of the invention.
Figure 2:
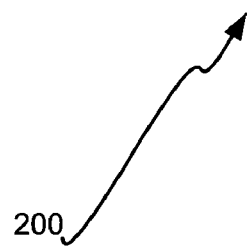

FIG. 2 shows a scenario 200 depicting how the timing between automatic, non-user-initiated pollings of the server 104 by the client 106 is changed based on the data downloaded from the server 104, according to an embodiment of the invention. The scenario 200 is described in relation to two different ways the timing between pollings of the server 104 can be changed. First, it is presumed that there is an initial timing $t_0$ between automatic, non-user-initiated pollings of the server 104, which may be user specified, for instance. Furthermore, it is presumed that the average amount of data that has been downloaded at each polling of the server 104 thus far is an amount of data X.

At the next polling of the server 104, an amount of data 202 is downloaded that is greater than the average amount of data X. Therefore, the timing that is waited for until the next polling of the server 104 is decreased. Thus, the timing $t_1$, represented by the arrow 204, is less than the timing $t_0$. Furthermore, the average amount of data X is updated to reflect the amount of data 202 that has been downloaded at the most recent polling of the server 104. At the next polling of the server 104, an amount of data 206 is downloaded that is less than the average amount of data X. Therefore, the timing that is waited for until the next polling of the server 104 is increased. Thus, the timing $t_2$, represented by the arrow 208, is greater than the timing $t_1$. The average amount of data X is again updated to reflect the amount of data 206 that has been downloaded most recently.

At the next polling of the server 104, no data may be downloaded, as represented by the reference number 210. Therefore, the timing that is waited for until the next polling of the server 104 is again increased, such that the timing $t_3$, represented by the arrow 212, is greater than the timing $t_2$. The average amount of data X is also updated to reflect that no data has been downloaded at the most recent polling of the server 104. The timing $t_3$ is waited for, and an amount of data 214 is downloaded at the next polling of the server 104. The process then continues as has been described.

The amount of data downloaded at a particular polling of the server 104 can encompass different ways of enumerating the data. For example, in the context of a mail server, the amount of data downloaded can be equated to the number of email messages downloaded from the server. Alternatively, the amount of data downloaded can be equated to the total size of all the email messages downloaded.

In a different embodiment also described in relation to the scenario 200 of FIG. 2, it is again presumed that there is an initial timing to between pollings of the server 104. Furthermore, there is a threshold amount of data Y, which may be user specified or otherwise specified. At the first polling of the server 104, an amount of data 202 is downloaded that is greater than the threshold amount of data Y. Therefore, the timing that is waited for until the next polling of the server 104 is decreased, such that the timing $t_1$ is less than the timing $t_0$.

At the next polling of the server 104, an amount of data 206 is downloaded that is less than the threshold amount of data Y. Therefore, the timing that is waited for until the next polling is increased, such that the timing $t_2$ is greater than the timing $t_1$. At the next polling, no data may be downloaded, as represented by the reference number 210. Therefore, the timing that is waited for until the next polling is again increased, such that the timing $t_3$ is greater than the timing $t_2$. The timing $t_3$ is waited for, and an amount of data 214 is downloaded at the next polling. The process then continues as has been described.

In this embodiment, too, the amount of data downloaded at a particular polling of the server 104 can encompass different ways of enumerating the data. In the context of a mail server, the amount of data downloaded can be equated to the number of email messages downloaded, such that the threshold Y is a threshold number of email messages. Alternatively, the amount of data downloaded can be equated to the total size of all the email messages downloaded, such that the threshold Y is a threshold size. Furthermore, it is noted that the data downloaded at the pollings of the server 104 can be used in other ways to change the timing between user-initiated automatic pollings of the server 104, besides those described herein in relation to FIG. 2.

Figure 3:
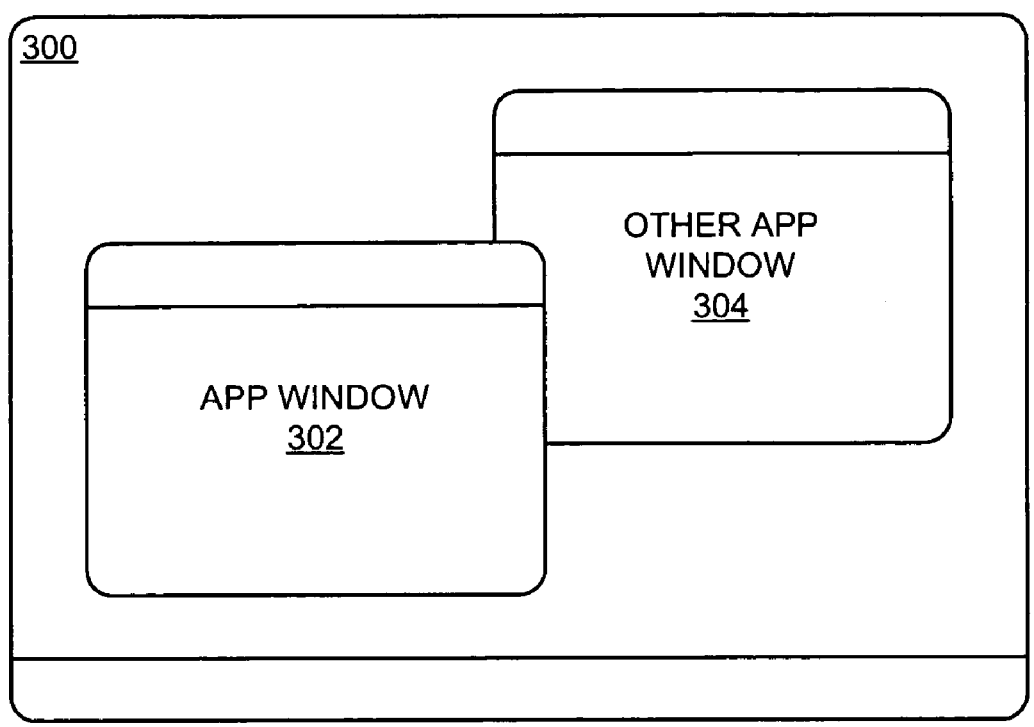
FIG. 3 is a diagram of a display depicting how user input as to the polling of a server can be used to change the timing between non-user-initiated, automatic pollings of the server, according to an embodiment of the invention.

FIG. 3 shows a display 300 depicting how user input as to the polling of the server 104 can be used to change the timing between non-user-initiated, automatic pollings of the server 104, according to an embodiment of the invention. The display 300 is particularly of a graphical user interface (GUI) of an operating system (OS), such as versions of the Microsoft Windows® operating system, available from Microsoft Corp., of Redmond, Wash., and which owns the Window® trademark, versions of the Macintosh® operating system, available from Apple Computer, Inc., of Cupertino, Calif., and which owns the Macintosh® trademark, versions of the Linux operating system, and so on. The display 300 has displayed therein two windows: an application window 302 and another application window 304.

The application window 302 is for an application computer program running on the OS and that polls the server 104 to download data from the server 104. The application window 304 is for a different computer program running on the OS that is not related to polling of the server 104 for downloading data from the server 104. As depicted in FIG. 3, the application window 302 is in the foreground as compared to the application window 304, such that it can be said that it has focus of the OS. That is, user input on the mouse, keyboard, and so on, is directed to the application window 302.

That the user has brought the application window 302 in the foreground as compared to the application window 304 is interpreted as user input in relation to the polling of the server 104. In particular, it is presumed that, because the user has brought the application window 302 to the foreground, the user is interested in retrieving data from the server 104. As a result, the timing between automatic, non-user-initiated pollings of the server is decreased in response. That is, when the application window 302 is in the foreground as compared to the windows of other computer programs, or otherwise has focus, the timing between automatic, non-user-initiated pollings of the server is decreased. When the window 302 is no longer in the foreground, and thus no longer has focus, then the timing between pollings is again increased.

Figure 4:
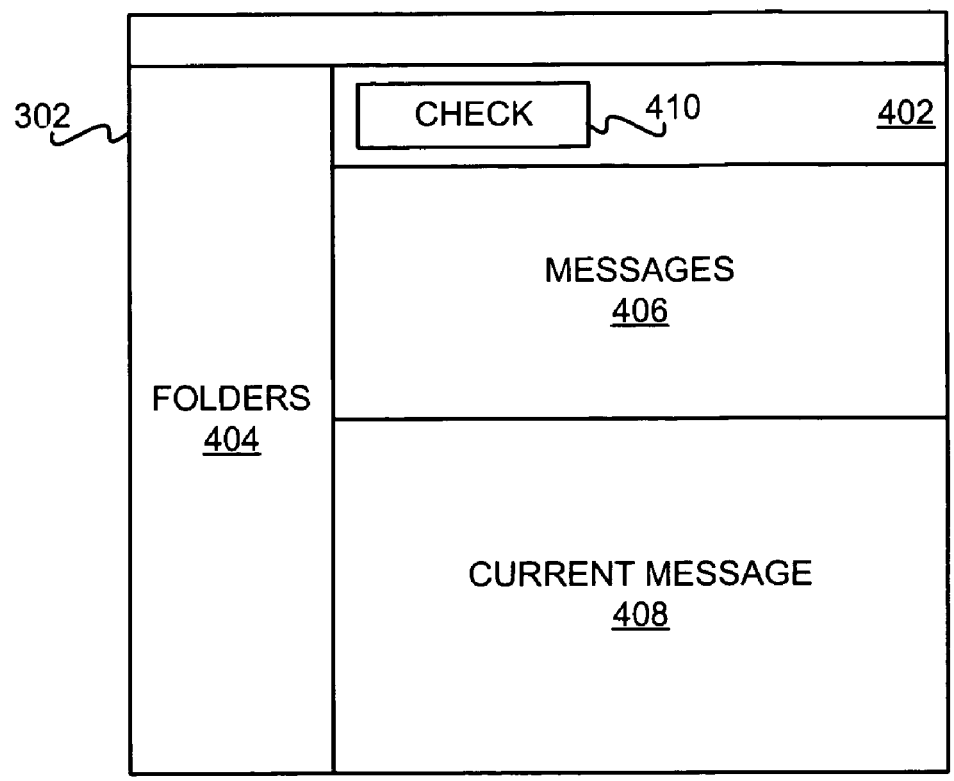
FIG. 4 is a diagram of an application program window depicting how user input as to the polling of a server can be used to change the timing between non-user-initiated, automatic pollings of the server, according to an embodiment of the invention.

FIG. 4 shows the application window 302 in detail to describe how user input as to the polling of the server 104 can also be used to change the timing between non-user-initiated, automatic pollings of the server 104, according to an embodiment of the invention. The application window 302 of FIG. 4 is specifically that for an email application program used to download email messages from a mail server for viewing. As such, the application window 302 includes a button area 402, including user-selectable buttons such as the check button 410, a folders area 404 in which folders in which email message can be organized are displayed, a messages area 406 in which the messages of a currently selected folder are displayed, and a current message area 408 in which a currently selected message is displayed.

The user is able to select the check button 410, by, for instance moving a pointer over the button 410 and pressing a button on a pointing device like a mouse, to manually initiate polling of the server 104 to download data such as email messages from the server 104. Such manual initiation of polling is thus user input in relation to polling of the server 104. Therefore, the timing between non-user-initiated, automatic pollings of the server 104 is decreased in response.

In one embodiment, each time the user initiates manual polling of the server 104, the timing between automatic, non-user-initiated pollings of the server 104 is decreased by a set length of time, and subsequently increased after a threshold length of time has elapsed after the last manual, user-initiated polling of the server 104. In another embodiment, if the user initiates manual polling of the server 104 more than a certain number of times in a given period of time, then the timing between automatic, non-user-initiated pollings of the server is decreased by a given length of time, and subsequently increased after a threshold length of time has elapsed after the last manual, user-initiated polling of the server. As can be appreciated by those of ordinary skill within the art, such user input in relation to polling of the server 104 can be used in other ways to change the timing between automatic, non-user-initiated pollings of the server 104. Furthermore, other user input in relation to polling of the server 104, besides that which has been described in relation to FIGS. 3 and 4, can be used to change the timing between automatic, non-user-initiated pollings of the server 104.

Figure 5:
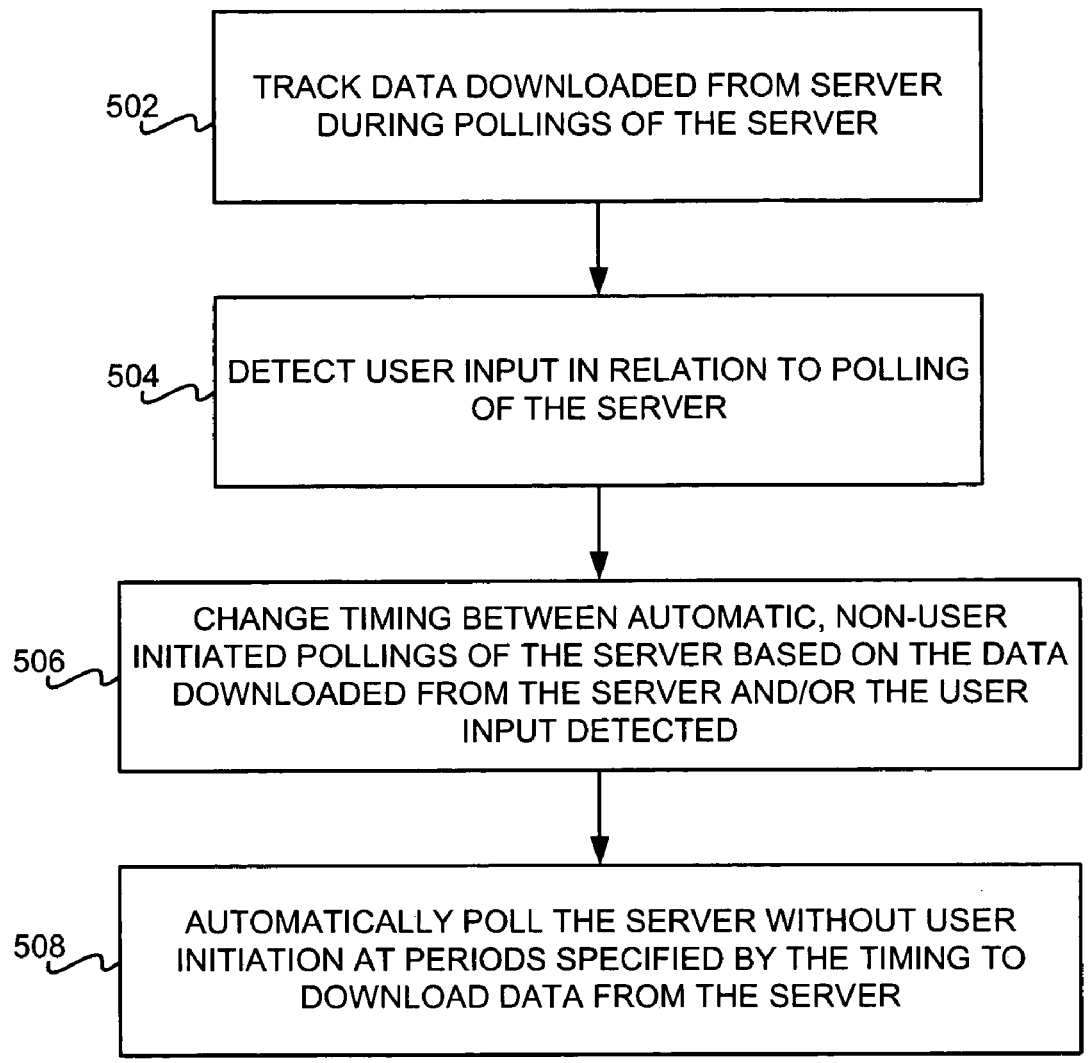
FIG. 5 is a flowchart of a method for changing the timing between non-user-initiated, automatic pollings of a server to download data from the server, according to an embodiment of the invention, and is suggested for printing on the first page of the patent.

FIG. 5 shows a method 500 for changing the timing between automatic, non-user-initiated pollings of the server 104, according to an embodiment of the invention. The client 106 may perform the method 500. For instance, an application computer program running on the client 106, such as that which has been described in relation to FIGS. 3 and 4, may perform the method 500.

Data downloaded from the server 104 during pollings of the server 104 may be tracked (502). For instance, the amount of data downloaded at each polling, the number of email messages downloaded at each polling, the average amount of data downloaded at each polling, and so on, may be recorded or otherwise tracked, as has been described in relation to FIG. 2. User input in relation to polling of the server 104 may also be detected (504). For instance, user initiation of manual polling of the server 104, as has been described in relation to FIG. 4, or user initiation of bringing a window of an application program into the foreground relative to other windows, as has been described in relation to FIG. 3, may be such user input.

The timing between automatic, non-user-initiated pollings of the server 104 is then changed, based on the data downloaded from the server, and/or based on the user input that has been detected (506). Such changing of the timing between automatic, non-user-initiated pollings of the server 104 may be accomplished as has been described in relation to FIGS. 2, 3, and/or 4. Finally, the method 500 automatically polls the server without user initiation at periods specified by the timing that has been changed, to download data from the server (508), such as email messages. The method 500 may be repeated as desired to periodically change the timing between automatic, non-user-initiated pollings of the server 104.

Figure 6:
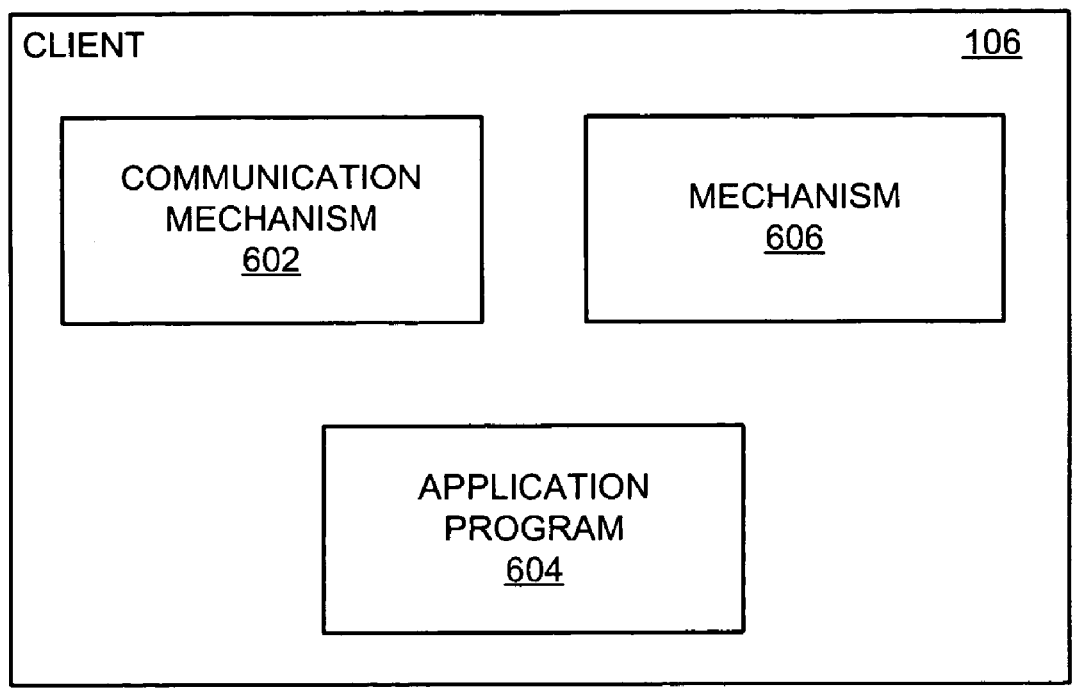
FIG. 6 is a diagram of a representative client to download data from a server, according to an embodiment of the invention.

FIG. 6 shows the client 106 that has been described in representative and rudimentary detail, according to an embodiment of the invention. The client 106 is depicted as including a communication mechanism 602, an application program 604, and another mechanism 606. As can be appreciated by those of ordinary skill within the art, the client 106 may include other components in addition to and/or in lieu of those depicted in FIG. 6.

The communication mechanism 602 includes at least hardware, and may also optionally include software. The mechanism 602 communicatively couples the client 106 to the network 102 to which the server 104 is also communicatively coupled. For instance, the mechanism 602 may be a modem, a network adapter, or another type of communication mechanism.

The application program 604 is the computer program that periodically automatically polls the server 104 without user initiation to download data from the server 104. The application program 604 may be an email application program, for instance. The application program 604 may have the application window 302 that has been described in FIGS. 3 and 4.

The mechanism 606 is implemented in software, hardware, or a combination of hardware and software. The mechanism 606 may be integrated within the application program 604 in one embodiment, or in another embodiment may be external to the application program 604. The mechanism 606 changes the timing between automatic, non-user-initiated pollings of the server 104 by the application program 604. The mechanism 606 reads or otherwise is aware of the initial timing between automatic, non-user-initiated pollings of the server 104, where such initial timing may be user specified in one embodiment. Furthermore, in embodiments of the invention that employ thresholds to determine whether to increase or decrease the timing, the mechanism 606 reads or otherwise is aware of such thresholds, which may also be user specified. The mechanism 606 changes this timing based on user input in relation to polling the server 104, and/or on the data downloaded from the server at each polling.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

I claim:

1. A method comprising:
    detecting user input in relation to an application program of a client polling a server to download data from the server for viewing by a user at the client;
    tracking an amount of data downloaded from the server at automatic, non-user-initiated pollings of the server;
    changing a timing between the automatic, non-user-initiated pollings of the server based at least on the user input detected, and based on the amount of data downloaded from the server at the automatic, non-user-initiated pollings of the server,
        wherein the timing between automatic, non-user-initiated pollings of the server is increased when the amount of data downloaded from the server during a most recent automatic, non-user-initiated polling of the server is less than a predetermined threshold,
        wherein the timing between automatic, non-user-initiated pollings of the server is decreased when the amount of data downloaded from the server during the most recent automatic, non-user-initiated polling of the server is greater than the predetermined threshold,
        and wherein the predetermined threshold is greater than zero; and,
    displaying at the client by the application program the data downloaded from the server for viewing by the user.

2. The method of claim 1, further comprising automatically polling the server without user initiation to download data from the server, at time periods controlled by the timing.

3. The method of claim 1, wherein detecting the user input in relation to polling the server comprises detecting that a user is initiating polling the server, such that the timing between the automatic, non-user-initiated pollings of the server is decreased in response.

4. The method of claim 1, wherein detecting the user input in relation to polling the server comprises detecting that an application program window in which the data is downloaded from the server has been brought into foreground relative to other windows, such that the timing between the automatic, non-user-initiated pollings of the server is decreased in response.

5. The method of claim 1, wherein the predetermined threshold is equal to an average amount of data downloaded from the server during previous automatic, non-user-initiated pollings of the server.

6. The method of claim 1, wherein polling the server to download the data from the server comprises polling an email server to download email messages from the email server.

7. A method comprising:
    tracking email messages downloaded from a email server at each of a plurality of automatic, non-user-initiated pollings of the email server; and,
    changing a timing between future automatic, non-user-initiated pollings of the email server based at least on email messages downloaded during a most recent automatic, non-user-initiated polling of the email server,
        wherein the timing between automatic, non-user-initiated pollings of the email server is decreased when a number of email messages downloaded from the email server during the most recent automatic, non-user-initiated polling of the server is greater than a predetermined threshold,
        wherein the timing between automatic, non-user-initiated pollings of the email server is increased when the number of email messages downloaded from the email server during the most recent automatic, non-user-initiated polling of the server is greater than the predetermined threshold,
        and wherein the predetermined threshold is greater than zero.

8. The method of claim 7, further comprising automatically polling the mail server without user initiation to download email messages from the server, at time periods controlling by the timing.

9. The method of claim 7, wherein the predetermined threshold is equal to an average number of email messages downloaded during previous automatic, non-user-initiated pollings of the server.

10. The method of claim 7, further comprising detecting user input in relation to polling the email server to download email messages from the email server,
wherein changing the timing between automatic, non-user-initiated pollings of the mail server is further based on the user input detected.

11. The method of claim 10, wherein detecting the user input in relation to polling the email server comprises detecting that a user is initiating polling the email server, such that the timing between automatic, non-user-initiated pollings of the email server is decreased in response.

12. The method of claim 10, wherein detecting the user input in relation to polling the email server comprises detecting that an application program window in which the email messages are downloaded from the email server has been brought into foreground relative to other windows, such that the timing between the automatic, non-user-initiated pollings of the email server is decreased in response.

13. A method comprising:
tracking an amount of data downloaded from a server at each of a plurality of automatic, non-user-initiated pollings of the server;
changing a timing between the automatic, non-user-initiated pollings of the server based on the amount of data downloaded from the server at the automatic, non-user-initiated pollings of the server; and,
automatically polling the server without user initiation to download data from the server, at time periods controlled by the timing,
wherein the timing between automatic, non-user-initiated pollings of the server is decreased when the amount of data downloaded from the server during a most recent automatic, non-user-initiated polling of the server is greater than a predetermined threshold,
wherein the timing between automatic, non-user-initiated pollings of the server is increased when the amount of data downloaded from the server during the most recent automatic, non-user-initiated polling of the server is less than the predetermined threshold,
and wherein the predetermined threshold is greater than zero.

14. The method of claim 13, wherein the predetermined threshold is equal to an average amount of data downloaded from the server during previous automatic, non-user-initiated pollings of the server.

15. The method of claim 13, wherein polling the server to download the data from the server comprises polling an email server to download email messages from the email server.

16. A computing device comprising:
a communication mechanism to communicatively couple the computing device to a network to which a server is also communicatively coupled, the communication mechanism including at least hardware;
an application program to periodically and automatically poll the server without user initiation to download data from the server; and,
a mechanism implemented at least in hardware, the mechanism to change a timing between automatic, non-user-initiated pollings of the server based at least on user input in relation to polling the server to download data from the server, and based at least on an amount of data downloaded from the server at each automatic, non-user-initiated polling of the server,
wherein the timing between automatic, non-user-initiated pollings of the server is increased when the amount of data downloaded from the server during a most recent automatic, non-user-initiated polling of the server is less than a predetermined threshold,
wherein the timing between automatic, non-user-initiated pollings of the server is decreased when the amount of data downloaded from the server during the most recent automatic, non-user-initiated polling of the server is greater than the predetermined threshold,
and wherein the predetermined threshold is greater than zero.

17. The computing device of claim 16, wherein the user input is one of:
user initiation of manual polling of the server; and,
user initiation of bringing a window of the application program into foreground relative to other windows.

18. An article of manufacture comprising:
a tangible computer-readable data storage medium; and,
means in the medium for changing a timing between automatic, non-user-initiated pollings of a server to download data from the server based on user input in relation to polling the server and based at least on an amount of data downloaded from the server at each automatic, non-user-initiated polling of the server,
wherein the timing between automatic, non-user-initiated pollings of the server is increased when the amount of data downloaded from the server during a most recent automatic, non-user-initiated polling of the server is less than a predetermined threshold,
wherein the timing between automatic, non-user-initiated pollings of the server is decreased when the amount of data downloaded from the server during the most recent automatic, non-user-initiated polling of the server is greater than the predetermined threshold,
and wherein the predetermined threshold is greater than zero.

19. The article of manufacture of claim 18, wherein the server is an email server, such that the email server is polled to download email messages from the email server.

* * * * *